(12) United States Patent
Wang et al.

(10) Patent No.: US 11,848,444 B2
(45) Date of Patent: Dec. 19, 2023

(54) PREPARATION METHOD OF POSITIVE ELECTRODE MATERIAL OF LITHIUM BATTERY

(71) Applicant: National Taiwan University of Science and Technology, Taipei (TW)

(72) Inventors: Fu-Ming Wang, Taipei (TW); Nan-Hung Yeh, Taipei (TW); Laurien Merinda, Taipei (TW); Xing-Chun Wang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 835 days.

(21) Appl. No.: 16/817,639

(22) Filed: Mar. 13, 2020

(65) Prior Publication Data

US 2021/0143422 A1 May 13, 2021

(30) Foreign Application Priority Data

Nov. 12, 2019 (TW) .................................. 108140968

(51) Int. Cl.
*H01M 4/525* (2010.01)
*H01M 4/505* (2010.01)
*H01M 4/131* (2010.01)
*H01M 4/02* (2006.01)
*H01M 10/0525* (2010.01)

(52) U.S. Cl.
CPC .......... *H01M 4/525* (2013.01); *H01M 4/131* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2016/0190580 A1 | 6/2016 | Pan et al. | |
| 2017/0210855 A1* | 7/2017 | Wang | ........................ H01M 4/13 |
| 2017/0309948 A1 | 10/2017 | Azami | |
| 2018/0131003 A1* | 5/2018 | Wang | ................. C08G 73/0644 |
| 2018/0145330 A1* | 5/2018 | Wang | ........................ H01M 4/60 |

FOREIGN PATENT DOCUMENTS

| | | |
|---|---|---|
| CN | 103050706 | 4/2013 |
| CN | 104513396 | 4/2015 |
| CN | 104638300 | 5/2015 |
| CN | 105247716 | 1/2016 |
| CN | 105449217 | 3/2016 |
| CN | 105609869 | 5/2016 |
| CN | 106129335 | 11/2016 |
| CN | 106549189 | 3/2017 |
| CN | 106997953 | 8/2017 |
| CN | 107078275 | 8/2017 |
| CN | 107078298 | 8/2017 |
| CN | 109755573 | 5/2019 |
| CN | 110140245 | 8/2019 |
| TW | I494350 | 8/2015 |
| TW | 201722850 | 7/2017 |
| TW | I602849 | 10/2017 |
| TW | I602857 | 10/2017 |
| TW | I608646 | 12/2017 |
| TW | I610968 | 1/2018 |
| TW | 201834304 | 9/2018 |
| TW | I643392 | 12/2018 |
| TW | I650341 | 2/2019 |
| TW | I663769 | 6/2019 |

OTHER PUBLICATIONS

Ye Mao et al., "Effect of moisture on the performance of LiNi0. 8Co0. 1Mn0. 1O2", Battery Bimonthly, with English abstract, Oct. 25, 2018, pp. 333-337.
"Office Action of China Counterpart Application", dated Nov. 19, 2021, p. 1-p. 9.
"Office Action of Taiwan Counterpart Application", dated Feb. 11, 2022, p. 1-p. 5.
"Office Action of Taiwan Counterpart Application", dated Apr. 14, 2020, p. 1-p. 4.
"Notice of allowance of China Counterpart Application", dated May 31, 2022, p. 1-p. 4.

* cited by examiner

*Primary Examiner* — Anca Eoff
(74) *Attorney, Agent, or Firm* — JCIPRNET

(57) ABSTRACT

A preparation method of a positive electrode material of a lithium battery is provided, including mixing a compound containing at least one ethylenically-unsaturated group and one carbonyl group or a derivative thereof and a Ni-rich oxide of lithium and transition metal to react. The compound containing at least one ethylenically-unsaturated group and one carbonyl group is selected from a group consisting of a maleimide-based compound, an acrylate-based compound, a methacrylate-based compound, an acrylamide-based compound, a vinylamide-based compound, and a combination thereof, and the Ni-rich oxide of lithium and transition metal is represented by formula I,

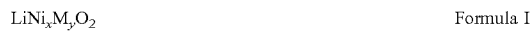

$$LiNi_xM_yO_2 \quad \text{Formula I}$$

wherein $x+y=1$, $1>x\geq 0.5$, and M is at least one transition metal element except Ni.

3 Claims, 3 Drawing Sheets

PREPARATION METHOD OF POSITIVE ELECTRODE MATERIAL OF LITHIUM BATTERY

CROSS-REFERENCE TO RELATED APPLICATION

This application claims the priority benefit of Taiwan patent application serial no. 108140968, filed on Nov. 12, 2019. The entirety of the above-mentioned patent application is hereby incorporated by reference here and made a part of this specification.

BACKGROUND OF THE INVENTION

Field of the Invention

The invention relates to a preparation method of a positive electrode material of a battery, and in particular to a preparation method of a positive electrode material of a lithium battery.

Description of Related Art

Since primary batteries are not environment-friendly, the market demand for secondary lithium batteries with characteristics such as rechargeability, light weight, high voltage value, and high energy density has been growing in recent years. As a result, current performance requirements for secondary lithium batteries such as lightweight, durability, high voltage, high energy density, and high safety have also become higher. In particular, secondary lithium batteries have relatively high potential in the application and expandability in light electric vehicles, electric vehicles, and the large power storage industry.

In current secondary lithium batteries, an oxide of lithium and transition metal (such as nickel) may be used as a positive electrode material. However, as the nickel content in the transition metal is increased, the content of trivalent nickel ions is increased accordingly, resulting in the forming of $LiNiO_2$. $LiNiO_2$ is readily reacted with water vapor and carbon dioxide to form lithium carbonate, thus causing battery performance degradation. In addition, the trivalent nickel ions in $LiNiO_2$ are reduced to divalent nickel ions, and the divalent nickel ions occupy the position of lithium ions during the charging process of the battery, thus causing a cation mixing phenomenon and causing battery performance degradation.

SUMMARY OF THE INVENTION

The invention provides a preparation method of a positive electrode material of a lithium battery that may effectively reduce or even prevent the reduction of trivalent nickel ions in the Ni-rich positive electrode material to divalent nickel ions that causes battery performance degradation.

A preparation method of a positive electrode material of a lithium battery of the invention includes mixing a compound containing at least one ethylenically-unsaturated group and one carbonyl group or a derivative thereof and a Ni-rich oxide of lithium and transition metal to react, wherein the compound containing at least one ethylenically-unsaturated group and one carbonyl group is selected from a group consisting of a maleimide-based compound, an acrylate-based compound, a methacrylate-based compound, an acrylamide-based compound, a vinylamide-based compound, and a combination thereof, and the Ni-rich oxide of lithium and transition metal is represented by formula I, $$LiNi_xM_yO_2 \qquad \text{Formula I}$$

wherein x+y=1, 1>x≥0.5, and M is at least one transition metal element except Ni.

In an embodiment of the preparation method of the positive electrode material of the lithium battery of the invention, M is, for example, at least one selected from Mn and Co.

In an embodiment of the preparation method of the positive electrode material of the lithium battery of the invention, the maleimide-based compound is, for example, monomaleimide (MI) or bismaleimide (BMI).

In an embodiment of the preparation method of the positive electrode material of the lithium battery of the invention, the maleimide-based compound is, for example, N,N'-1,4-phenylenedimaleimide.

In an embodiment of the preparation method of the positive electrode material of the lithium battery of the invention, the acrylate-based compound is, for example, polyethylene glycol diacrylate (PEGDA).

In an embodiment of the preparation method of the positive electrode material of the lithium battery of the invention, the methacrylate-based compound is, for example, bisphenol A dimethacrylate (BMA).

In an embodiment of the preparation method of the positive electrode material of the lithium battery of the invention, the acrylamide-based compound is, for example, bisacrylamide (BA).

In an embodiment of the preparation method of the positive electrode material of the lithium battery of the invention, the vinylamide-based compound is, for example, N-vinylformamide (NVF) or N-vinylacetamide (NVA).

In an embodiment of the preparation method of the positive electrode material of the lithium battery of the invention, an amount ratio of the compound containing at least one ethylenically-unsaturated group and one carbonyl group or the derivative thereof and the Ni-rich oxide of lithium and transition metal is, for example, between 1:1000 and 1:100.

Based on the above, in the preparation method of the positive electrode material of the lithium battery of the invention, Ni-rich oxide of lithium and transition metal and a compound containing at least one ethylenically-unsaturated group and one carbonyl group or the derivatives thereof are mixed. Therefore, nickel ions in the Ni-rich positive electrode material forming $LiNiO_2$ resulting in battery performance degradation may be reduced or prevented.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
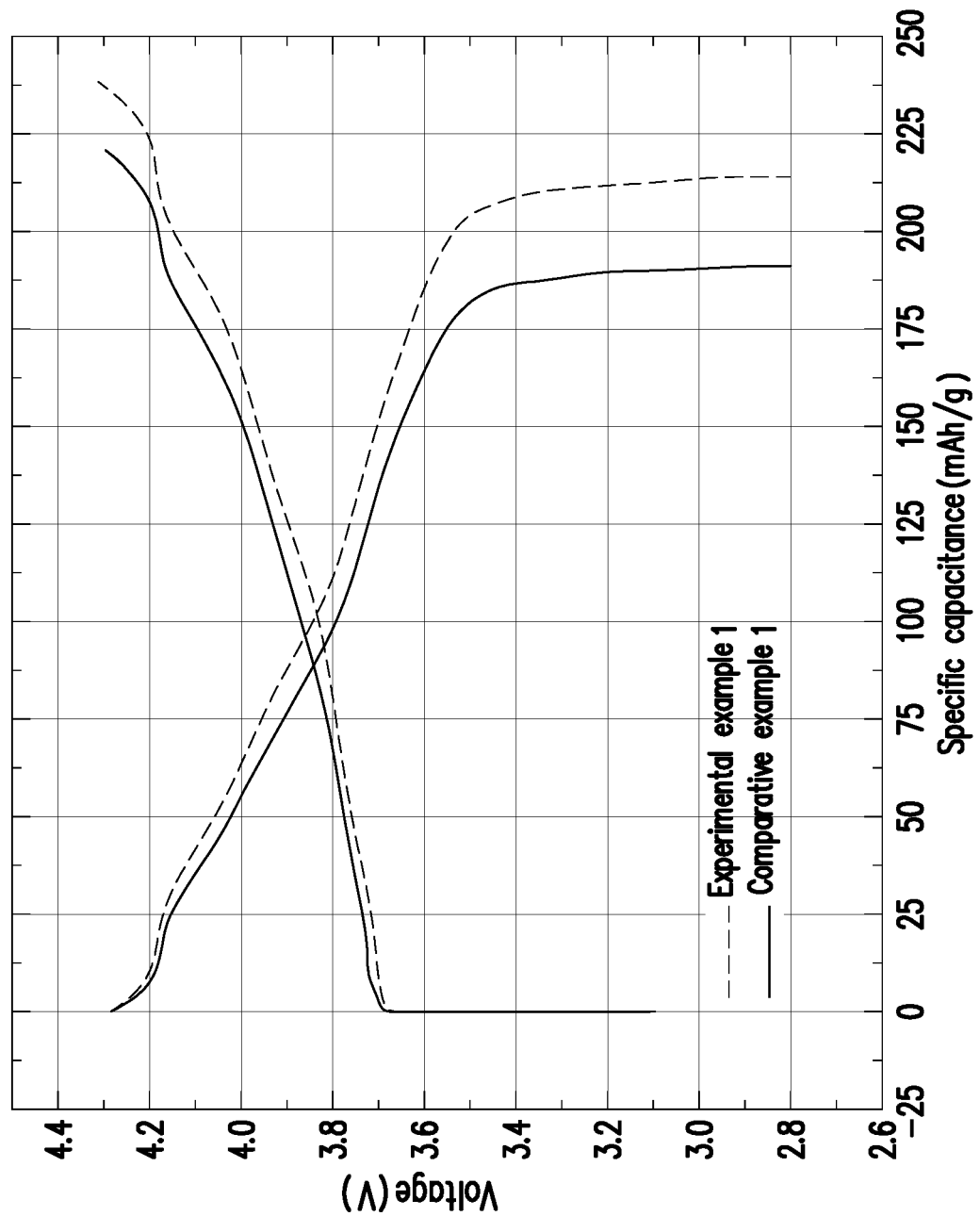
FIG. 1 is a discharge curve of the battery of Comparative example 1 and the battery of Experimental example 1 at an initial cycle of 0.1 C at room temperature.

In the present specification, a range represented by "a numerical value to another numerical value" is a schematic representation for avoiding listing all of the numerical values in the range in the specification. Therefore, the description of a specific numerical range covers any numerical value within the numerical range and a smaller numerical range defined by any numerical value within the numerical range.

In the invention, preparing a positive electrode material of a lithium battery using Ni-rich oxide of lithium and transition metal and a compound containing at least one ethylenically-unsaturated group and one carbonyl group or a derivative thereof may effectively increase the capacitance of the lithium battery, and at the same time effectively reduce or even prevent nickel ions in the prepared Ni-rich positive electrode material from forming $LiNiO_2$ and reduce or even prevent cation mixing. In this way, the capacitance of the lithium battery is increased, and excessive degradation of battery performance is prevented.

In an embodiment of the invention, a compound containing at least one ethylenically-unsaturated group and one carbonyl group or a derivative thereof and Ni-rich oxide of lithium and transition metal are mixed to react. Via the above reaction, reduction of trivalent nickel ions to divalent nickel ions may be effectively reduced or even prevented.

In an embodiment of the invention, "the Ni-rich oxide of lithium and transition metal" refers to a metal oxide containing lithium, nickel, and at least one transition metal except nickel, and based on the total amount of transition metal in the oxide, the nickel content is 50% or more. The transition metal other than nickel is, for example, Mn, Co, Al, Cr, or Fe, and is preferably Mn or Co. In other words, in the invention, the Ni-rich oxide of lithium and transition metal is represented by Formula I, $$LiNi_xM_yO_2 \quad \text{Formula I}$$

wherein x+y=1, 1>x≥0.5, and M is at least one transition metal element except Ni.

In Formula I, when M represents only one transition metal element, the content of the transition metal element is less than 50% based on the total amount of the transition metal in the oxide. In addition, when M represents two or more transition metal elements, the total content of the two or more transition metal elements is less than 50% based on the total amount of the transition metals in the oxide, and the invention does not limit the content of each of the two or more transition metal elements.

In an embodiment of the invention, the compound containing at least one ethylenically-unsaturated group and one carbonyl group are selected from a group consisting of a maleimide-based compound, an acrylate-based compound, a methacrylate-based compound, an acrylamide-based compound, a vinylamide-based compound, and a combination thereof. The maleimide-based compound is, for example, monomaleimide or bismaleimide. For example, the maleimide compound may be N,N'-1,4-phenylenedimaleimide. The acrylate-based compound may be polyethylene glycol diacrylate. The methacrylate-based compound may be bisphenol A dimethacrylate. The acrylamide-based compound may be bisacrylamide. The vinylamide-based compound may be N-vinylformamide or N-vinylacetamide.

In addition, in an embodiment of the invention, the compound containing at least one ethylenically-unsaturated group and one carbonyl group may also be a derivative of the compound. For example, the compound containing at least one ethylenically-unsaturated group and one carbonyl group may be a derivative A1 or a derivative A2 produced by the reaction of bismaleimide and barbituric acid (BTA). The reaction mechanism thereof may be as follows:

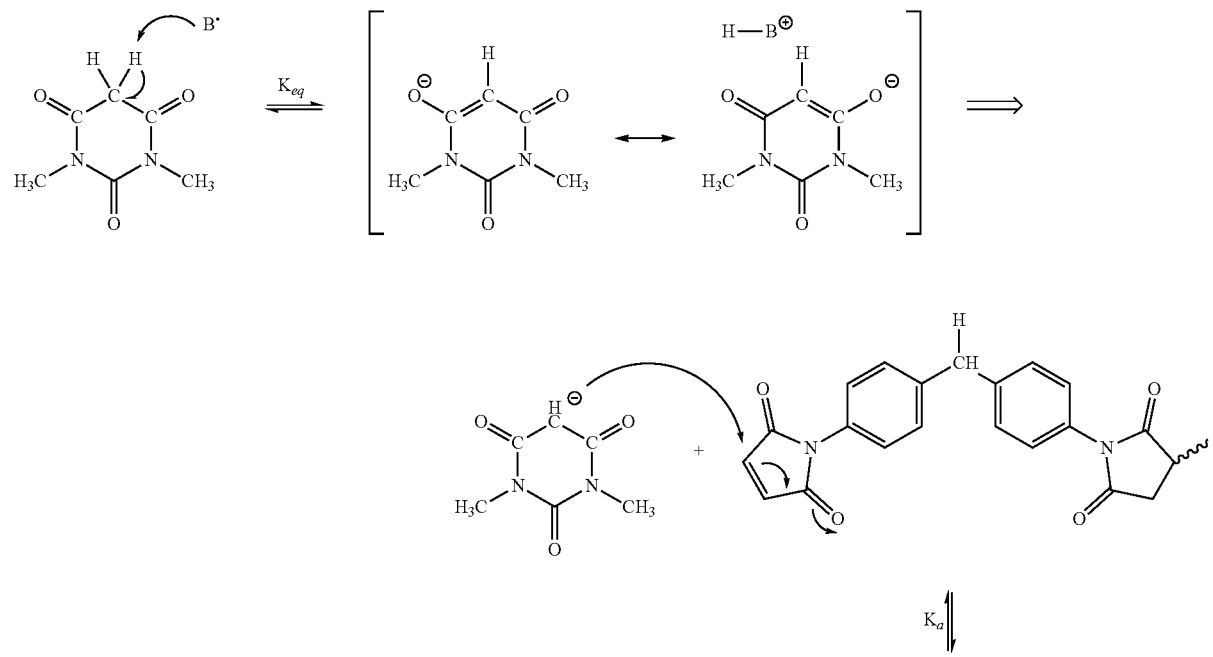

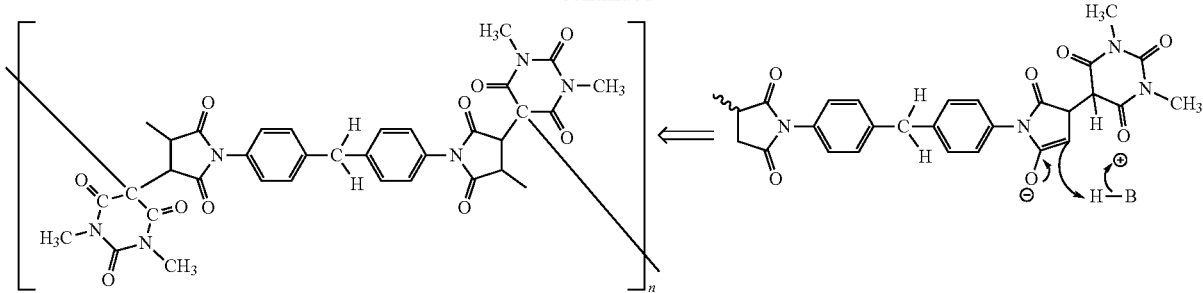

A1
(n is an integer of 25 to 250)

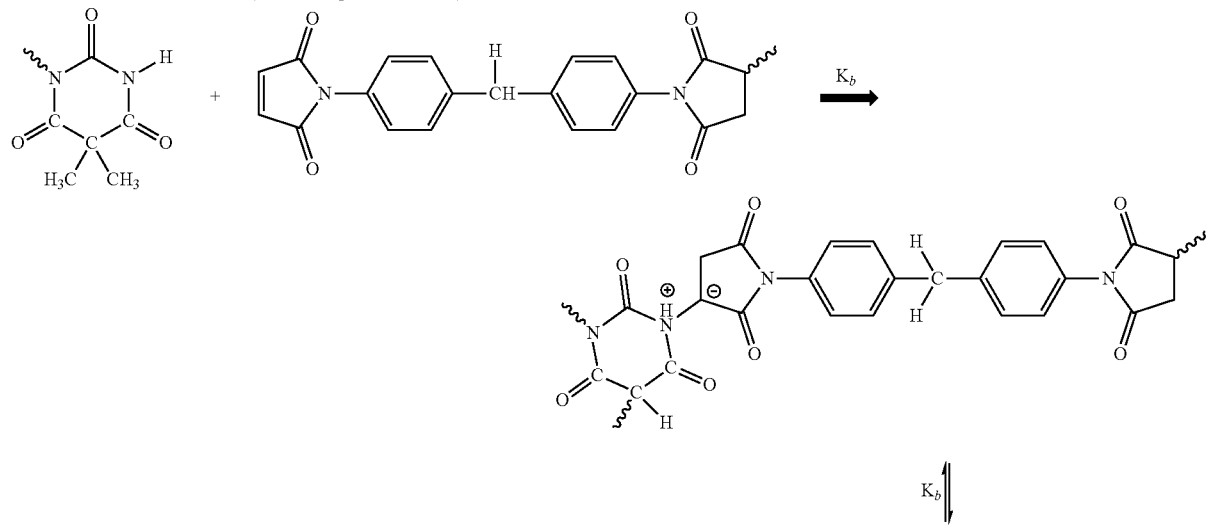

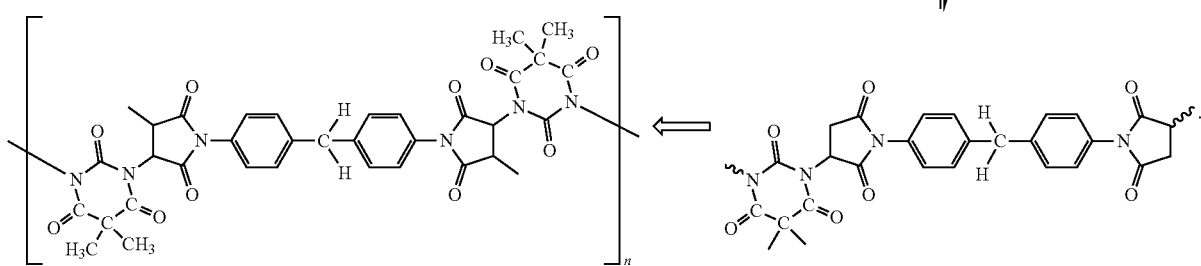

A2
(n is an integer of 25 to 250)

In an embodiment of the invention, an amount ratio of the compound containing at least one ethylenically-unsaturated group and one carbonyl group or a derivative thereof and the Ni-rich oxide of lithium and transition metal is, for example, between 1:1000 and 1:100. When the compound containing at least one ethylenically-unsaturated group and one carbonyl group or a derivative thereof and the Ni-rich oxide of lithium and transition metal are mixed, the two are reacted to produce chemical bonding or physical adsorption, and therefore the reduction of trivalent nickel ions to divalent nickel ions that causes cation mixing may be reduced or even prevented. When the amount of the compound containing at least one ethylenically-unsaturated group and one carbonyl group or a derivative thereof is smaller than the above range, the phenomenon of cation mixing is significant, and therefore battery performance is poor. When the amount of the compound containing at least one ethyleni- cally-unsaturated group and one carbonyl group or a derivative thereof exceeds the above range by 10 parts by weight, battery resistance is too large, and battery performance is also poor.

The effects of the positive electrode material prepared by the preparation method of the invention are described below with Experimental examples and Comparative examples.

COMPARATIVE EXAMPLE 1

94 wt. % of Ni-rich oxide of lithium and transition metal ($LiNi_{0.8}Mn_{0.1}Co_{0.1}O_2$, NMC811), 3 wt. % of carbon black (conductive powder), and 3 wt. % of a binder (poly(vinylidene fluoride) (PVDF)) were added to a solvent (N-methylpyrrolidone (NMP)) (solid content: 20%), and stirring was performed evenly at room temperature for three hours before the mixture was coated on aluminum foil (coating thickness:

100 pm). Then, the coated aluminum foil was placed in an oven and vacuum-baked at 150° C. for 2 hours to remove the solvent. Then, the dried film was rolled to 80% of the original thickness using a rolling machine to manufacture a positive electrode of a lithium battery.

COMPARATIVE EXAMPLE 2

A positive electrode of a lithium battery was manufactured in the same manner as in Comparative example 1 except that the Ni-rich oxide of lithium and transition metal in Comparative example 1 was replaced with NMC622 ($LiNi_{0.6}Mn_{0.2}Co_{0.2}O_2$).

EXPERIMENTAL EXAMPLE 1

N,N'-1,4-phenylenedimaleimide was dissolved in NMP (1% solid content) to form a first solution. 94 wt. % of Ni-rich oxide of lithium and transition metal ($LiNi_{0.8}Mn_{0.1}Co_{0.1}O_2$, NMC811), 3 wt. % of carbon black (conductive powder), 3 wt. % of PVDF, and a little NMP were mixed into a second solution. Then, the first solution and the second solution were mixed and reacted to form a mixed slurry (20% solid content). Then, the positive electrode of Experimental example 1 was prepared by the same preparation method as Comparative example 1.

EXPERIMENTAL EXAMPLE 2

A positive electrode of a lithium battery was manufactured in the same manner as in Experimental example 1 except that the Ni-rich oxide of lithium and transition metal in Experimental example 1 were replaced with NMC622.

EXPERIMENTAL EXAMPLE 3

PEGDA was dissolved in NMP (1% solid content) to form a first solution. 94 wt. % of Ni-rich oxide of lithium and transition metal ($LiNi_{0.6}Mn_{0.2}Co_{0.2}O_2$, NMC622), 3 wt. % of carbon black (conductive powder), 3 wt. % of PVDF, and a little NMP were mixed into a second solution. Then, the first solution and the second solution were mixed and reacted to form a mixed slurry (20% solid content). Then, the positive electrode of Experimental example 1 was prepared by the same preparation method as Comparative example 3.

EXPERIMENTAL EXAMPLE 4

The derivative A2 was dissolved in NMP (5% solid content) to form a first solution. 94 wt. % of Ni-rich oxide of lithium and transition metal ($LiNi_{0.6}Mn_{0.2}Co_{0.2}O_2$, NMC622), 3 wt. % of carbon black (conductive powder), 3 wt. % of PVDF, and a little NMP were mixed into a second solution. Then, the first solution and the second solution were mixed and reacted to form a mixed slurry (20% solid content). Then, the positive electrode of Experimental example 1 was prepared by the same preparation method as Comparative example 4.

Preparation and Testing of Batteries

Batteries were manufactured respectively using the positive electrodes of Comparative example 1, Comparative example 2, and Experimental example 1 to Experimental example 4, lithium foil negative electrodes, and an electrolyte solution (1 M lithium hexafluorophosphate in ethylene carbonate (EC) and dimethyl carbonate (DMC) with a volume ratio of 1:1). Then, the batteries of Comparative example 1, Comparative example 2, and Experimental example 1 to Experimental example 4 were tested. The test conditions were 0.1 C (the battery capacity was fully charged or discharged in ten hours), and the charge and discharge interval was 2.8 V to 4.3 V. The test results are shown in FIG. 1 to FIG. 3.

FIG. 1 is a discharge curve of the battery of Comparative example 1 and the battery of Experimental example 1 at an initial cycle of 0.1 C at room temperature. It may be seen from FIG. 1 that the capacitance of Experimental example 1 (216.8 mAh/g) is significantly higher than the capacitance of Comparative example 1 (191.1 mAh/g). In addition, the reversible ratio (90.7%) of the charge-discharge amount of the battery of Experimental example 1 is also higher than the reversible ratio (86.8%) of the charge-discharge amount of the battery of Comparative example 1. It may be seen that the positive electrode material prepared by the preparation method of the invention (mixing a maleimide-based compound with Ni-rich oxide of lithium, manganese, and cobalt to produce a reaction) may effectively improve the reversibility of an electrochemical reaction and capacitance.

Figure 2:
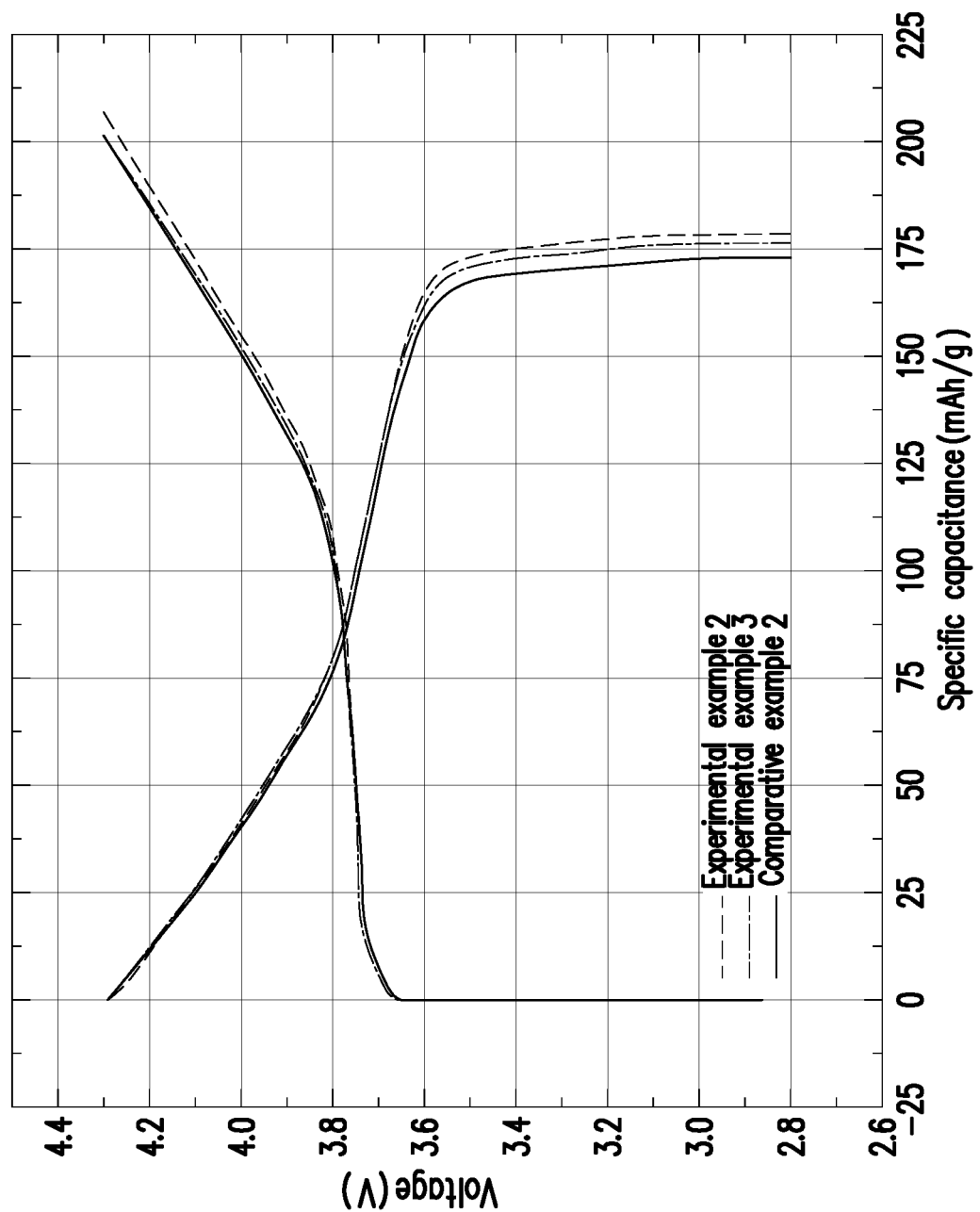
FIG. 2 is a discharge curve of the battery of Comparative example 2 and the batteries of Experimental example 2 and Experimental example 3 at an initial cycle of 0.1 C at room temperature.

FIG. 2 is a discharge curve of the battery of Comparative example 2 and the batteries of Experimental example 2 and Experimental example 3 at an initial cycle of 0.1 C at room temperature. It may be seen from FIG. 2 that the capacitance of Experimental example 2 (179.3 mAh/g) and the capacitance of Experimental example 3 (176.7 mAh/g) are significantly higher than the capacitance of Comparative example 2 (173.5 mAh/g). In addition, the reversible ratio (86.7%) of the charge-discharge amount of the battery of Experimental example 2 and the reversible ratio (87.7%) of the charge-discharge amount of the battery of Experimental example 3 are also higher than the reversible ratio (86.4%) of the charge-discharge amount of the battery of Comparative example 2. It may be seen that the positive electrode material prepared by the preparation method of the invention (mixing a maleimide-based compound or an acrylate-based compound with Ni-rich oxide of lithium, manganese, and cobalt to produce a reaction) may effectively improve the reversibility of an electrochemical reaction and capacitance.

Figure 3:
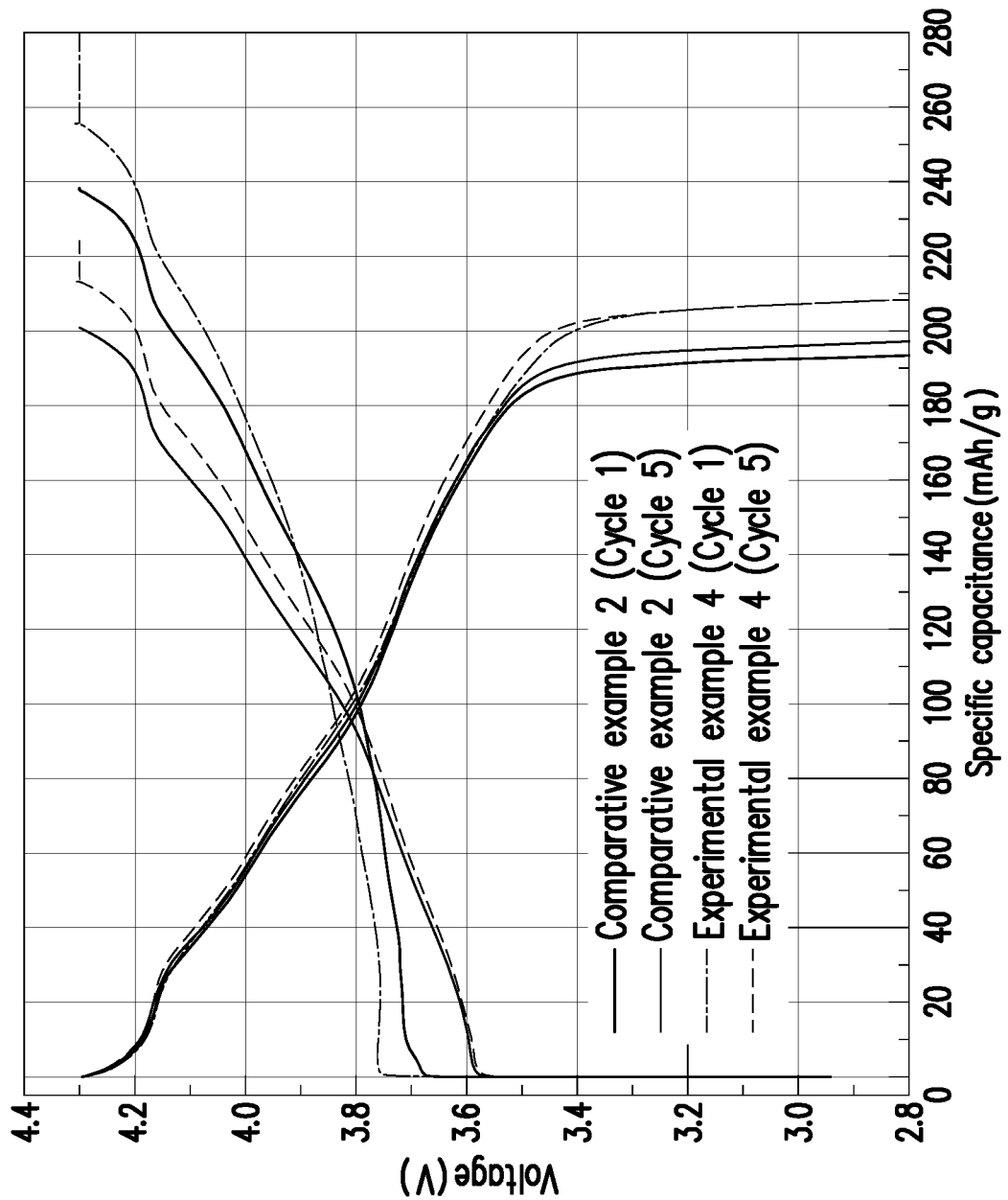
FIG. 3 is a discharge curve of the battery of Comparative example 2 and the battery of Experimental example 4 at an initial cycle of 0.1 C at room temperature.

FIG. 3 is a discharge curve of the battery of Comparative example 2 and the battery of Experimental example 4 at an initial cycle of 0.1 C at room temperature. It may be seen from FIG. 3 that the capacitance of Experimental example 4 (such as 208.4 mAh/g) is significantly higher than the capacitance of Comparative example 2 (such as 193.3 mAh/g). It may be seen that the positive electrode material prepared by the preparation method of the invention (mixing a maleimide-based compound or an acrylate-based compound with Ni-rich oxide of lithium, manganese, and cobalt to produce a reaction) may effectively improve the reversibility of an electrochemical reaction and capacitance.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A preparation method of a positive electrode material of a lithium battery, comprising:
providing a first solution, wherein the first solution is composed of a compound containing at least one ethylenically-unsaturated group and one carbonyl group dissolved in a solvent, the compound containing at least one ethylenically-unsaturated group and one carbonyl group includes N,N'-1,4-phenylenedimaleimide;

providing a second solution, wherein the second solution comprises a Ni-rich oxide of lithium and transition metal, a binder and a conductive powder, wherein the Ni-rich oxide of lithium and transition metal is represented by formula I, $$LiNi_xM_yO_2 \qquad \text{Formula I}$$

wherein x+y=1, 1>x≥0.5, and M is at least one transition metal element except Ni, and mixing the first solution and the second solution to react.

2. The preparation method of the positive electrode material of the lithium battery of claim 1, wherein M is selected from at least one of Mn and Co.

3. The preparation method of the positive electrode material of the lithium battery of claim 1, wherein an amount ratio of the compound containing at least one ethylenically-unsaturated group and one carbonyl group and the Ni-rich oxide of lithium and transition metal is between 1:1000 and 1:100.

* * * * *